United States Patent
Shoda et al.

(10) Patent No.: US 7,253,956 B2
(45) Date of Patent: Aug. 7, 2007

(54) OPTICAL ISOLATOR ELEMENT, A METHOD FOR PRODUCING SUCH AN ELEMENT, AND AN OPTICAL ISOLATOR USING SUCH AN ELEMENT

(75) Inventors: Michifumi Shoda, Kitami (JP); Yasushi Sato, Kitami (JP); Yukiko Furukata, Kawasaki (JP); Yoshiyuki Shigeoka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 64 days.

(21) Appl. No.: 10/758,692

(22) Filed: Jan. 15, 2004

(65) Prior Publication Data

US 2004/0174598 A1    Sep. 9, 2004

(30) Foreign Application Priority Data

Jan. 29, 2003 (JP) .............................. 2003-021093

(51) Int. Cl.
*G02B 27/28* (2006.01)
*G02B 1/00* (2006.01)
*G02B 5/30* (2006.01)
*C03C 27/06* (2006.01)

(52) U.S. Cl. .................. 359/484; 372/703; 359/497
(58) Field of Classification Search ................ 359/484
See application file for complete search history.

(56) References Cited

U.S. PATENT DOCUMENTS 4,984,875 A * 1/1991 Abe et al. .................. 359/281
5,161,049 A * 11/1992 Tanno et al. ............... 359/281
6,153,495 A * 11/2000 Kub et al. .................. 438/459
2003/0124328 A1* 7/2003 Yoshikawa et al. ........ 428/212
2003/0206345 A1* 11/2003 Sabia et al. ................ 359/484
2003/0206347 A1* 11/2003 Sabia et al. ................ 359/484

FOREIGN PATENT DOCUMENTS

| JP | 04-338916 | 11/1992 |
| JP | 08-146351 | 6/1996 |
| JP | 2000-056265 | 2/2000 |
| JP | 2002-321947 | 11/2002 |
| WO | 03/093896 | 11/2003 |

OTHER PUBLICATIONS

Haisma, et al., "Surface Preparation and Phenomenological Aspects of Direct Bonding" Philips Journal of Research, Elsevier, Amsterdam, NL, vol. 49, No. 1, 1995, pp. 23-46.

* cited by examiner

*Primary Examiner*—Leonidas Boutsikaris
*Assistant Examiner*—Mark Consilvio
(74) *Attorney, Agent, or Firm*—Hogan & Hartson LLP (57) ABSTRACT

An optical isolator is constructed such that an optical isolator element in which at least one flat Faraday rotator and at least two flat polarizers are bonded to each other into an integral unit by van der Waals forces or hydrogen-bonding forces acting between bonding surfaces of the Faraday rotator and the polarizers is accommodated in a tubular magnetic element.

4 Claims, 8 Drawing Sheets

OPTICAL ISOLATOR ELEMENT, A METHOD FOR PRODUCING SUCH AN ELEMENT, AND AN OPTICAL ISOLATOR USING SUCH AN ELEMENT

BACKGROUND OF THE INVENTION AND RELATED ART STATEMENT

The present invention relates to an optical isolator element used to eliminate a return light created upon introducing a light emitted from a light source to various optical elements and optical fibers, a method for producing such an element, and an optical isolator using such an element.

In an optical communication module, a light emitted from a light source such as a laser light source is incident on various optical elements and optical fibers. A part of the incident light is reflected and scattered by the end faces of the various optical elements and the optical fibers or inside them. A part of the reflected or scattered light returns to the light source as a return light if no measure is taken. Thus, an optical isolator is used in order to prevent the return light from returning to the light source.

Conventionally, an optical isolator of this type has been constructed such that a flat Faraday rotator is disposed between two polarizers and these three parts are accommodated in a tubular magnetic element via part holders. Normally, the Faraday rotator is adjusted to have such a thickness as to rotate a plane of polarization of a light having a specific wavelength by 45° in a saturated magnetic field, and the two polarizers are rotationally adjusted such that their transmitting and polarizing directions are shifted by 45° in rotating direction.

The optional isolator having the above construction requires three separate parts of the Faraday rotator and the two polarizers and the holders for the respective parts, resulting in a large number of parts and, thus, a large number of assembling steps. In addition, it has been cumbersome to give an optical adjustment between the respective parts, leading to a higher cost. Further, it has been difficult to miniaturize the optical isolator due to its large number of parts.

In view of this, there has been proposed an optical isolator designated for miniaturization by constructing an optical isolator element as an integral unit by adhering flat polarizers to both surfaces of a flat Faraday rotator by an adhesive and arranging the optical isolator element in a middle portion of a tubular magnetic element.

Figure 10:
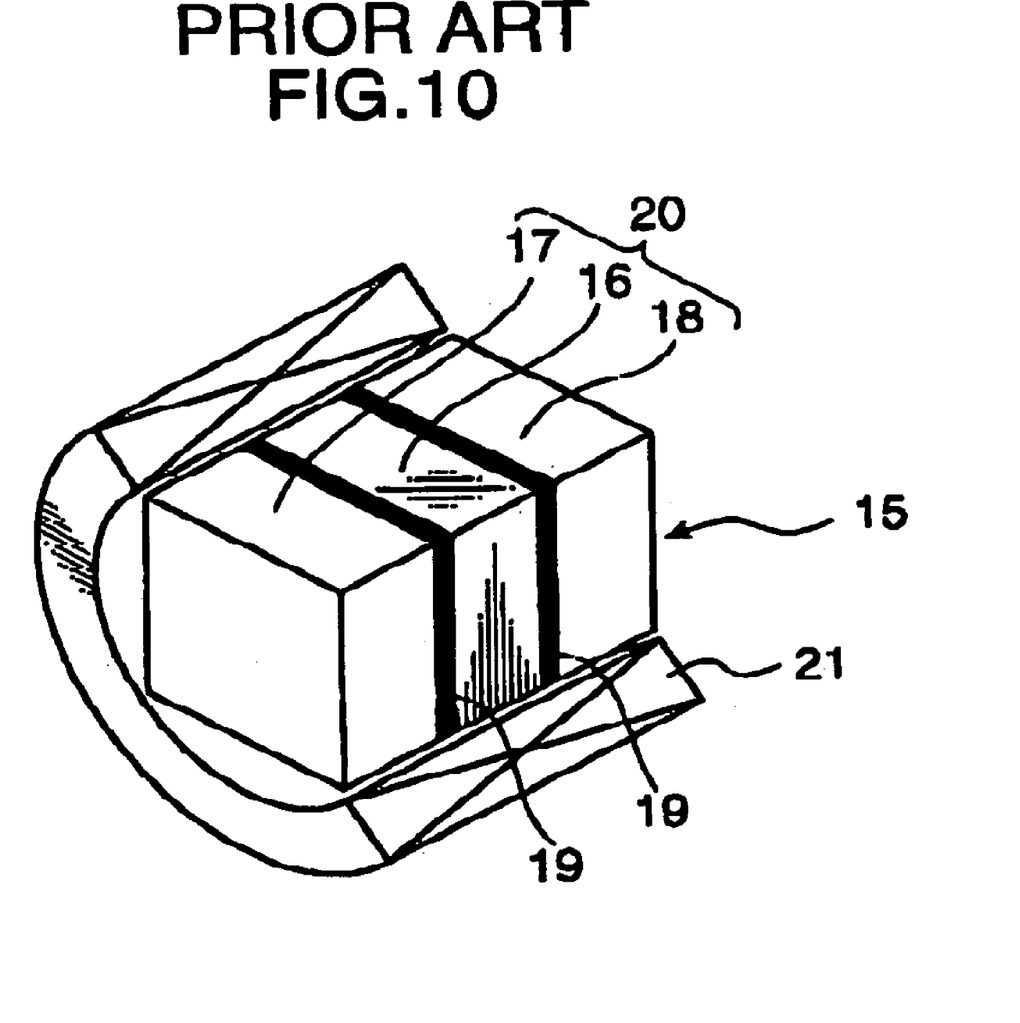
FIG. 10 is a perspective view showing the construction of a prior art optical isolator.

FIG. 10 is a diagram showing the construction of the optical isolator miniaturized by forming the parts into an integral unit by the adhesive.

In FIG. 10, an optical isolator 15 is comprised of an optical isolator element 20 in which a Faraday rotator 16 and polarizers 17, 18 are adhered by an optical adhesive 19 having a good light transmitting property and a controlled refractive index, and a tubular magnetic element 21 for accommodating the optical isolator element 20. Here, the polarizers 17, 18 have a function of absorbing light components polarized in one direction out of a propagating light and causing light components polarized in a direction orthogonal to the former light components to transmit. Further, the Faraday rotator 16 has a function of rotation a plane of polarization of a light having a specified wavelength by about 45° at a saturated magnetic field intensity. The two polarizers 17, 18 are arranged such that their transmitting and polarizing directions are shifted by about 45°.

FIGS. 11 to 14 are diagrams showing a method for producing the above conventional optical isolator element 20.

Figure 11:
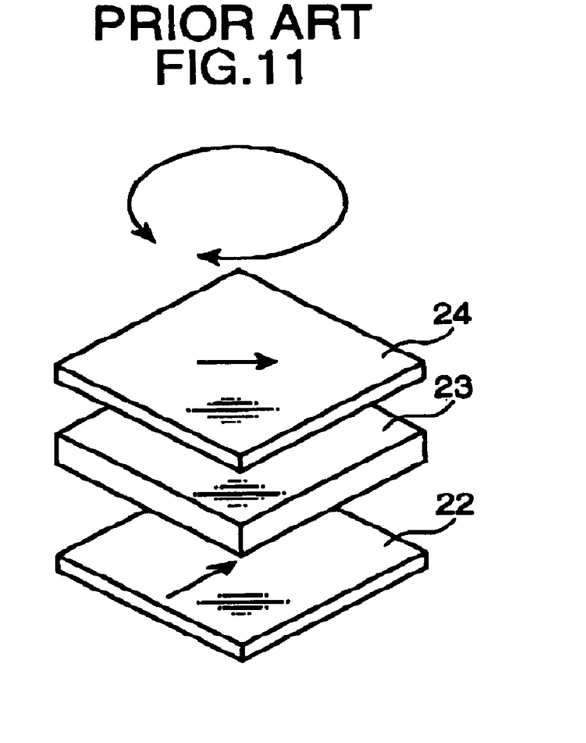
FIGS. 11, 12, 13 and 14 are diagrams showing a method for producing an optical isolator element as a part of the prior art optical isolator.
Figure 12:
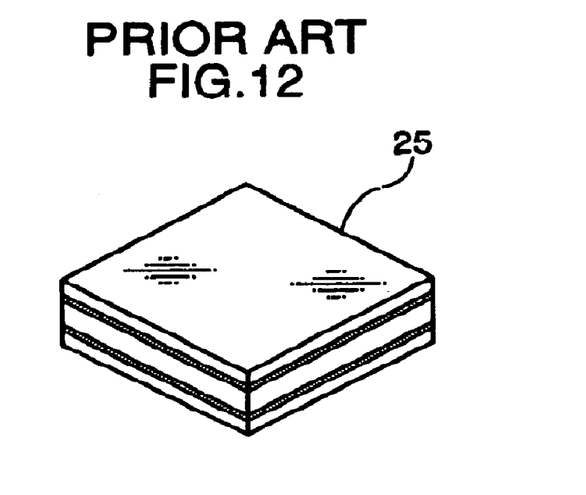

First, as shown in FIGS. 11 and 12, a polarizer base 22, a Faraday rotator base 23 and a polarizer base 24, which are large square optical elements having a side of about 10 mm, are formed into an integral unit by adhesion. Here, the transmitting and polarizing directions of the polarizer base 22 are set at a direction parallel with a certain side thereof (direction indicated by an arrow in FIG. 11), and those of the polarizer base 24 are set at a direction (direction indicated by an arrow in FIG. 11) at 45° to a certain side thereof. The polarizer bases 22, 24 and the Faraday rotator base 23 are so adhered that the respective sides thereof are parallel with each other, thereby obtaining an optical isolator element base 25. An optically transparent resin is used as the adhesive for adhering the respective optical elements as described above. Generally, an epoxy or acrylic organic adhesive is used as this adhesive.

Here, in the case that the optical isolator is required to have a high isolation, it is necessary to precisely adjust the rotational displacements of the polarizers bases 22, 24 at $45-\alpha°$ with respect to a polarization rotation angle $45+\alpha°$ of the Faraday rotator base 23. Specifically, the polarizer bases 22, 24 are so rotationally adjusted as to minimize the transmission of a light incident in reverse direction (for example, from the side of the polarizer base 24).

Figure 13:
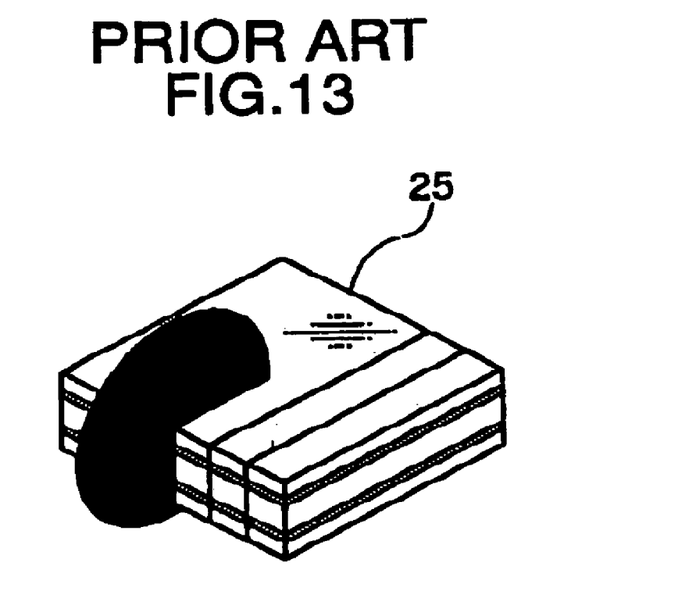
Figure 14:
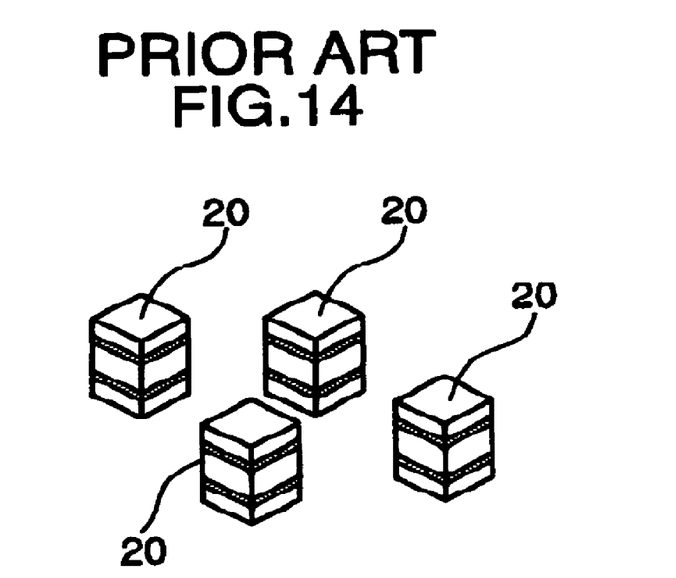

Next, as shown in FIGS. 13 and 14, the optical isolator element base 25 are out, for example, by a dicer into a multitude of optical isolator elements 20 in the form of small chips (see Japanese Unexamined Patent Publication No. H04-338916).

By using the method for producing a multitude of optical isolator elements 20 by forming a layered element by successively placing the polarizer base 22, the Faraday base 23 and the polarizer base 24, which are large optical element bases, one over another and cutting this layered element after the adhesion, operability can be improved, productivity can be increased and the number of parts can be reduced. Generally, an epoxy or acrylic organic adhesive is used as the optical adhesive 19 shown in FIG. 10.

The inventor of the present invention proposed a miniaturized optical isolator in which no resin was used to adhere the respective optical elements. In this optical isolator, a transparent low melting point glass was used to bond the Faraday rotator 16 and the polarizers 17, 18 forming the optical isolator element 20 shown in FIG. 10 instead of the resin. A method for producing this optical isolator element 20 is substantially same as the one shown in FIGS. 11 to 14 except that, upon forming the polarizer bases 22, 24 and the Faraday rotator base 23 into an integral unit, the transparent low melting point glasses are placed between the respective bases and heated up to a temperature where the low melting point glasses are molten, thereby bonding the respective bases (see Japanese Unexamined Patent Publication No. H08-146351).

However, the optical isolator element 20 obtained by integrally bonding the flat polarizers 17, 18 on both surfaces of the Faraday rotator 16 by the adhesive 19 as described above has a problem of a lower humidity resistance in the case that the adhesive 19 is an organic adhesive, whereby the use of this optical isolator element 20 particularly under a high-temperature and high-humidity condition is restricted. Further, there is a danger that the adhesive 19 changes its property when the optical isolator element 20 is used for a long time or used with a high-output laser beam, which leads to reduced reliability.

The optical isolator 15 including the optical isolator element 20 is exposed to high temperature upon being incorporated into a laser module. Thus, if an organic adhesive is used as the adhesive 19, the adhesive 19 is decomposed to produce air bubbles, thereby creating clearances between the Faraday rotator 16 and the polarizers 17, 18 or causing the parts of the optical isolator 15 to come off. Further, an outgas from the organic adhesive 19 attaches to the outer surfaces of optical components such as a laser chip and lenses to deteriorate optical characteristics.

In the optical isolator element 20 integrally bonded by adhering the flat polarizers 17, 18 on both surfaces of the Faraday rotator 16 by the low melting point glass 19, since the glass transition temperature of the low melting point glass 19 is as high as several hundreds degrees, a thermal stress increases upon being cooled to a room temperature after the glass 19 is molten to secure the respective parts, wherefore there is a danger of cracking the respective parts and the low melting point glass 19. Further, if a thermal stress acts on the Faraday rotator 16, the extinction ratio of the light transmitting the Faraday rotator 16 is reduced, thereby deteriorating various characteristics of the optical isolator 15, particularly a reverse-direction loss characteristic.

SUMMARY OF THE INVENTION

In view of the above situation, an object of the present invention is to provide an optical isolator element capable of solving the problems residing in the prior art, a method for producing such an element and an optical isolator using such an element.

In order to accomplish this object, a first aspect of the present invention is directed to an optical isolator element, comprising at least one flat Faraday rotator; and at least two flat polarizers, wherein the Faraday rotator and the polarizers are bonded to each other by van der Waals forces acting between bonding surfaces thereof.

With this construction, the flat Faraday rotator and the flat polarizers are bonded into an integral unit by the van der Waals forces acting between the bonding surfaces thereof. Thus, the creation of cracks resulting from a thermal stress can be suppressed and an optical isolator element having excellent light resistance, heat resistance, humidity resistance and isolation characteristic can be obtained.

A second aspect of the present invention is directed to an optical isolator element, comprising at least one flat Faraday rotator; and at least two flat polarizers, wherein the Faraday rotator and the polarizers are bonded to each other by hydrogen-bonded forces acting between bonding surfaces thereof.

With this construction, the flat Faraday rotator and the flat polarizers are bonded into an integral unit by the hydrogen-bonding forces acting between the bonding surfaces thereof. Thus, the creation of cracks resulting from a thermal stress can be suppressed and an optical isolator element having excellent light resistance, heat resistance, humidity resistance and isolation characteristic can be obtained.

A third aspect of the present invention is directed to an optical isolator comprising an optical isolator element including at least one flat Faraday rotator and at least two flat polarizers bonded to each other by van der Waals forces acting between bonding surfaces thereof; and a magnetic element arranged around the optical isolator element.

With this construction, since the optical isolator element is an integral unit of the flat Faraday rotator and the flat polarizers bonded to each other by the van der Waals forces acting between the bonding surfaces thereof, an optical isolator having excellent light resistance, heat resistance, humidity resistance and isolation characteristic can be obtained.

A fourth aspect of the present invention is directed to an optical isolator comprising an optical isolator element including at least one flat Faraday rotator and at least two flat polarizers bonded to each other by hydrogen-bonding forces acting between bonding surfaces thereof; and a magnetic element arranged around the optical isolator element.

With this construction, since the optical isolator element is an integral unit of this flat Faraday and the flat polarizers bonded to each other by the hydrogen bonding forces acting between the bonding surface thereof, an optical isolator having excellent light resistance, heat resistance, humidity resistance and isolation characteristic can be obtained.

A fifth aspect of the present invention is directed to a method for producing an optical isolator element including at least one flat Faraday rotator and at least two flat polarizers bonded to each other, comprising the steps of activating bonding surfaces of the Faraday rotator and the polarizers; and bringing the Faraday rotator and the polarizers having the bonding surfaces thereof activated into contact with each other in vacuum, thereby bonding the Faraday rotator and the polarizers by van der Waals forces created on the bonding surfaces of the Faraday rotator and the polarizers.

With this method, since the flat Faraday rotator and the flat polarizers are bonded into an integral unit by the van der Waals forces acting between the bonding surfaces thereof, no organic adhesive or no low melting point glass is present unlike the prior art. Thus, the creation of cracks resulting from a thermal stress can be suppressed and an optical isolator element having excellent light resistance, heat resistance, humidity resistance and isolation characteristic can be obtained.

A sixth aspect of the present invention is directed to a method for producing an optical isolator element including at least one flat Faraday rotator and at least two flat polarizers bonded to each other, comprising the steps of cleaning bonding surface of the Faraday rotator and the polarizers; activating the bonding surfaces of at least either one of the Faraday rotator and the polarizers by the adsorption of hydroxyl groups; and bringing the Faraday rotator and the polarizer into contact with each other in vacuum, thereby bonding the Faraday rotator and the polarizer by hydrogen-bonding forces acting between the hydroxyl groups on the bonding surfaces at one side and oxygen atoms in the other bonding surfaces.

With this method, since the flat Faraday rotator and the flat polarizers are bonded into an integral unit by the hydrogen-bonding forces acting between the bonding surfaces thereof, the creation of cracks resulting from a thermal stress can be suppressed and an optical isolator element having excellent light resistance, heat resistance, humidity resistance and isolation characteristic can be obtained.

These and other objects, features and advantages of the present invention will become more apparent upon reading the following detailed description with the accompanying drawings.

DETAILED DESCRIPTION OF THE PREFERRED EMBODIMENT OF THE INVENTION

Figure 1:
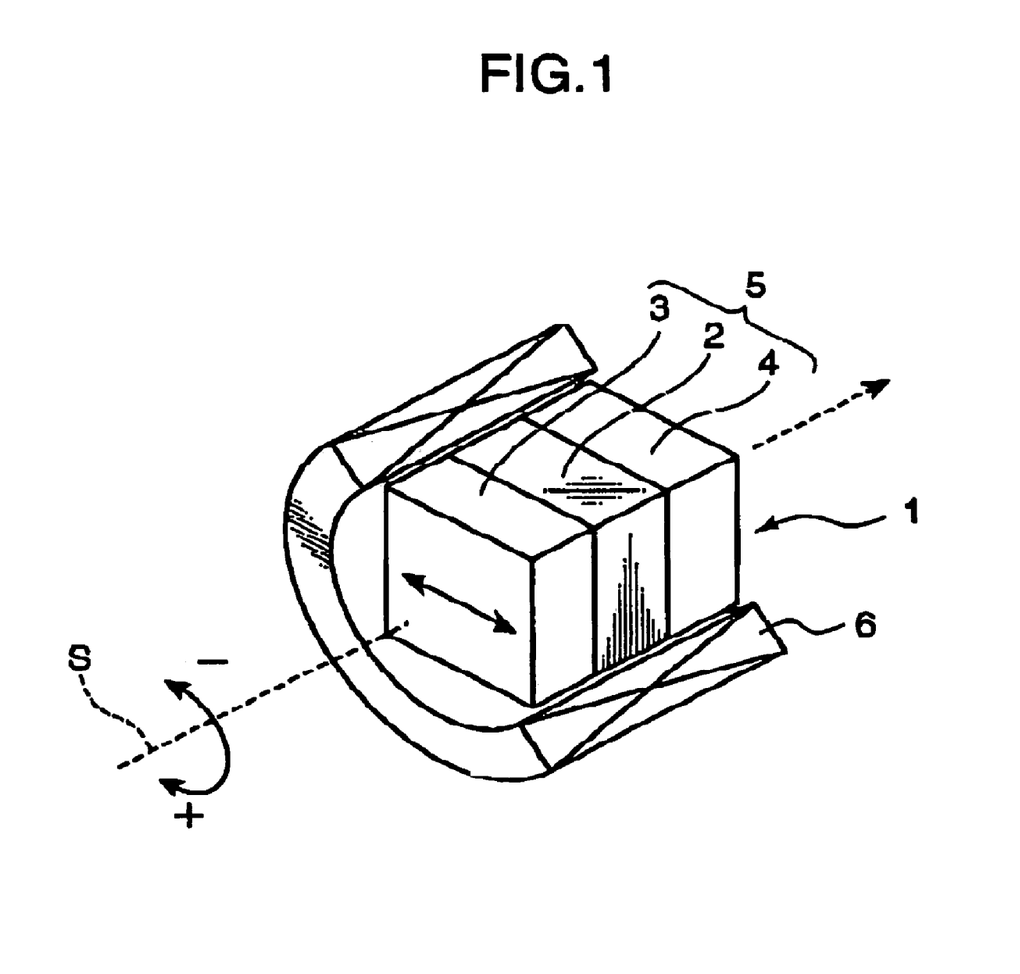
FIG. 1 is a perspective view showing an essential portion of an optical isolator according to one embodiment of the invention.

FIG. 1 is a perspective view showing an essential portion of an optical isolator according to one embodiment of the invention. In FIG. 1, an optical isolator 1 is comprised of an optical isolator element 5 as an integral layered unit obtained by bonding flat polarizers 3, 4 on both sides of a flat Faraday rotator 2, and a tubular magnetic element 6 for accommodating this optical isolator element 5. It should be noted that the optical isolator element 5 is produced by bonding large polarizer bases on both sides of a large Faraday rotator base and then cutting a bonded unit into pieces of a suitable size as described later.

The Faraday rotator 2 is, for example, made of bismuth-substituted garnet crystals and the thickness thereof is set such that a plane of polarization of an incident beam having a specific wavelength is rotated by 45°. Generally, a sufficient magnetic field needs to be applied in a direction of an optic axis S of the incident beam in order to rotate the plane of polarization. If a self-bias type Faraday rotator is used, the optical isolator 1 operates without any magnetic element. Thus, the magnetic element 6 is unnecessary in this case.

The polarizers 3, 4 are adsorption type polarizers having a function of absorbing light components polarized in one direction out of an incident or birefringent polarizers for splitting or combining light components polarized in one direction out of an incident light. For example, in the case that the Faraday rotator 2 is adapted to rotate a plane of polarization of the incident light by 45° about an optic axis and the polarizers 3, 4 are adsorption type polarizers, the transmitting and polarizing directions of the polarizer 3 are shifted by 45° about the optic axis with respect to those of the polarizer 4.

In this embodiment, at bonding surfaces of the polarizer 3 and the Faraday rotator 2 and those of the Faraday rotator 2 and the polarizer 4, atoms in the respective surfaces are directly bonded at normal temperature. In other words, no different kind of material such as an adhesive is present at the bonding surfaces of the Faraday rotator 2 and the polarizers 3, 4 and only very thin intermediate layers of several nm, which are parts of the Faraday rotator 2 and the polarizers 3, 4, are present in this embodiment.

Figure 2:
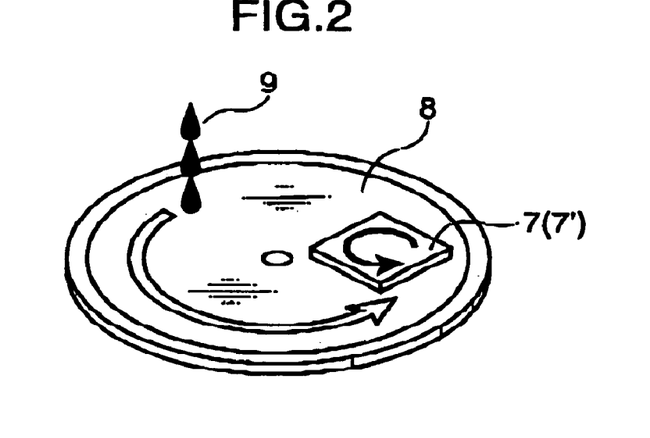
FIGS. 2, 3 and 4 are diagrams showing a method for producing an optical isolator element as a part of the inventive optical isolator.
Figure 3:
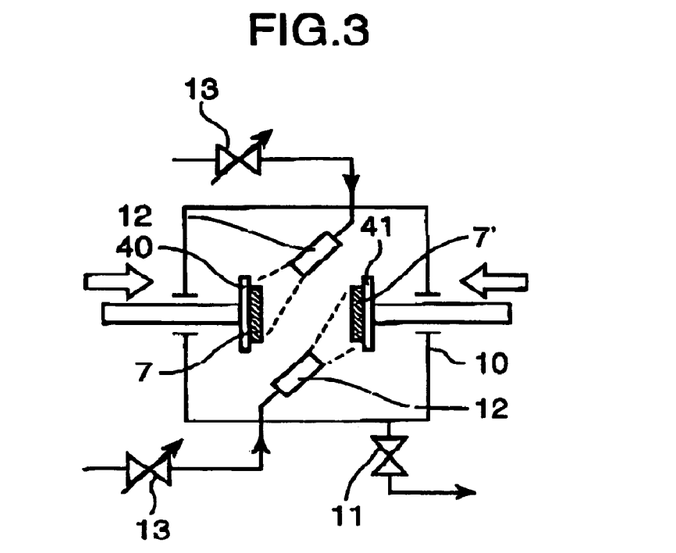

FIGS. 2, 3 and 4 are diagrams showing a method for producing the optical isolator element according to the present invention. First, in order to directly bond large rectangular polarizer bases and a large rectangular Faraday rotator base without providing any different kind of material such as an adhesive therebetween, the large rectangular polarizers bases 7 and the large rectangular Faraday rotator base 7' have their outer surfaces smoothed by polishing as shown in FIG. 2, and then the smoothed outer surfaces are cleaned by spattering to be activated as shown in FIG. 3.

The above polishing is conducted, for example, by a method called CMP (chemical mechanical polishing) for polishing an object using a mixture of a solution having a chemically corrosive action and abrasive grains of ceramic or diamond. The polished surface is desirably a super smooth surface, for example, having a flatness of 10 μm or lower and a surface coarseness of 10 nm or lower. Further, in order to directly bond the two bases without providing any different kind of material such as an adhesive therebetween, polishing is so conducted as to remove damaged layers formed by chemically changing the outer surfaces in the process of processing the bases. According to the above CMP method, polishing can be conducted at a precision of several nm and almost no damage is given to the bases under the polished layers.

The CMP method is comprised of a polishing step and a cleaning step. In the polishing step, as shown in FIG. 2, the outer surfaces of the polarizer bases 7 and the Faraday rotator base 7' are polished in a colloidal silica 9 obtained by suspending $SiO_2$ particles having an average particular diameter of 30 nm in a NaOH solution after polishing using a polishing pad 8 in ultrapure water. In the cleaning step, the respective bases 7, 7' are cleaned by ultrapure water in an ultrasonic bath after being cleaned by an alcohol in an ultrasonic bath, and then dried by a spin drier. Between the respective cleaning steps, the bases 7, 7' are rinsed by ultrapure water.

For information, mere machine polishing can attain desired values of flatness and surfaces coarseness, but leaves damaged layers chemically changed by the processing. Thus, no face bonding is possible for such polished surfaces.

Subsequently, after the above polishing process, the large polarizer base 7 and the large Faraday rotator base 7' are opposed to each other while being supported on supporting members 40, 41 in a vacuum bath 10 and ion beams or neutral atoms are projected thereto for a specified period a suitable projection intensity as shown in FIG. 3, thereby removing a layer of gas atoms attached to the bonding surfaces in the air and an outer-surface layer (about 10 nm) such as contaminants and oxide film to expose clean surfaces. Specifically, ion beams of an inert gas such as an argon or neutral atoms are projected to clean the outer surfacers to become bonding surfaces, thereby activating the outer surfaces. Normally, when the outer surface of an object is etched by spattering by projecting an inert gas (fast atom beam) such as an argon fast atom beam, the outer-surface layer can be removed to thereby activate the outer surface. By this processing, the bonding surface is brought to an active state where it has a strong bonding force to other atoms.

Here, the vacuum bath 10 is made vacuum by discharging air by means of a vacuum pump 11. A degree of vacuum is desired to be as high as possible since it influences a degree of cleanness, and in reality needs to be $10^{-2}$ Pa or higher (preferably up to about $10^{-4}$ Pa). Identified by 12, 13 in FIG. 3 are a beam source and an inert gas introducing device.

When the two supporting members 40, 41 are moved in directions toward each other at room temperature in vacuum to bring the outer surfaces of the polarizes base 7 and the Faraday rotator base 7' into close surface contact after the activating step, the polarizer base 7 and the Faraday rotator base 7' attract each other by van der Waals forces. It should be noted that many bonds, which are not joined, i.e. dangling bonds can be seen in the cleaned outer surfaces of the polarizer base 7 and the Faraday rotator 7'. Since these dangling bonds are very active, if they are left as they are, impurities such as nitrogen, carbon and hydrocarbon residual in the vacuum bath 10 are chemically absorbed to the outer surfaces to inactivate them even if the vacuum bath 10 is held to be highly vacuous. Thus, the polarizer bases 7 and the Faraday rotator base 7' need to be attached to each other within as short a period as possible after the activating step.

It is preferable to apply a pressure at the time of attaching the surfaces in order to strongly bond the polarizer base 7 and the Faraday rotator base 7'. This force of pressure is largely related to the surface coarseness of the bonding surfaces. For example, if the bonding surfaces have a surface coarseness of about 10 nmRa, the surfaces can be attached even with a small force of pressure of about 1 kgf.

Next, though not shown, the bonded bases are supported on the one supporting member 40 in the vacuum bath 10 such that the side of the Faraday rotator base 7' is faced up, another polarizer base 7 is supported on the other supporting member 41 and, similar top the above, the polishing step and the activating step are performed to bring the new polarizer base 7 and the Faraday rotator base 7' into contact and bond them by van der Waals forces. In this way, a large optical element 14 (see FIG. 4) in which the polarizer bases 7 are directly bonded at both sides of the Faraday rotator base 7' is obtained. It should be noted that, similar to the above, a pressing force is desirably applied at the time of bringing the other polarizer base 7 and the Faraday rotator base 7' into contact.

Here, in the case that the optical isolator 1 shown in FIG. 1 is required to have a high isolation, it is necessary to precisely adjust the rotational displacements of the polarizers 3, 4 in the transmitting and polarizing directions with respect to the polarization rotation angle 45+α of the Faraday rotator 2 at 45−α. Specifically, upon bonding the large Faraday rotator base and the large polarizer bases, the large polarizer bases are so rotationally adjusted as to minimally transmit a light incident in reverse direction.

If the transmitting and polarizing directions in relation to the outer shape of the large polarizer bases, the polarization rotation angle and the like of the large Faraday rotator base and the polarization characteristics of the polarizer bases 7 and the Faraday rotator base 7' are measured beforehand, the optical isolator element 5 having excellent optical characteristics can be obtained by bonding the polarizer bases 7 and the Faraday rotator base 7' after adjusting the relative angles of these bases 7, 7' in the vacuum bath 10.

Further, if the Faraday rotator 2 and the polarizers 3, 4 shown in FIG. 1 are directly bonded, a part of an incident beam is reflected since boundary portions of the Faraday rotator 2 and the polarizers 3, 4 have different refractive indices. However, reflection can be prevented if an anti-reflection film made of a multilayer film (e.g. multilayer film having $SiO_2$, $TiO_2$ or $Ta_2O_5$ on the outer surface thereof) made of inorganic material having a refractive index approximate to that of the adjacent base is formed on the outer surface of each of the polarizer bases 7 and the Faraday rotator base 7' facing the boundary portion. In such a case, the bonding principle does not change although films of about several hundreds nm made of, for example, $SiO_2$, $TiO_2$ or $Ta_2O_5$ are bonded at the boundary portion. Further, if a film having a thickness of several hundreds nm to several μm and made of a material having the same refractive index as that of the adjacent polarizer base 7 or the Faraday rotator base 7' is formed on the outer surface of the formed anti-reflection film, a reflection preventing function normally operates because the anti-reflection film remains even if the outer layer is removed by several tens nm during the activating step. It is sufficient to provide this multilayer film made of the inorganic material either on the bonding surface of the polarizer base 7 or that of the Faraday rotator base 7'.

Figure 4:
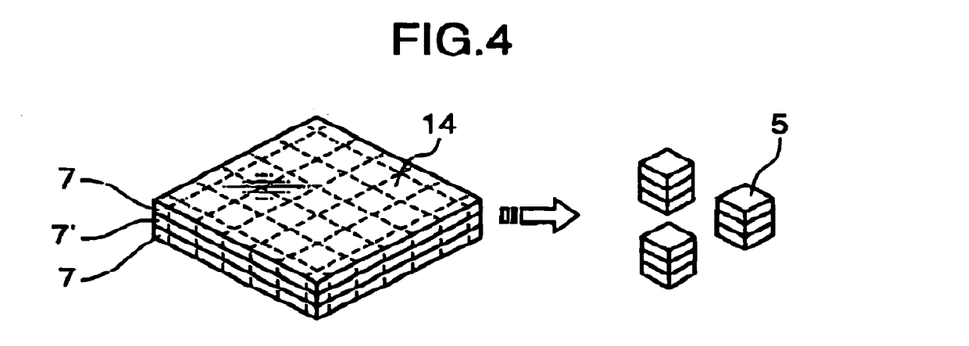

Finally, as shown in FIG. 4, the large optical element 14 in which the polarizer bases 7 are directly bonded at both sides of the Faraday rotator base 7' is out to a suitable size using a dicing method, a wire cutting method or a like method, thereby obtaining a plurality (multitude) of optical isolator elements 5 bonded by the van der Waals forces.

Figure 5:
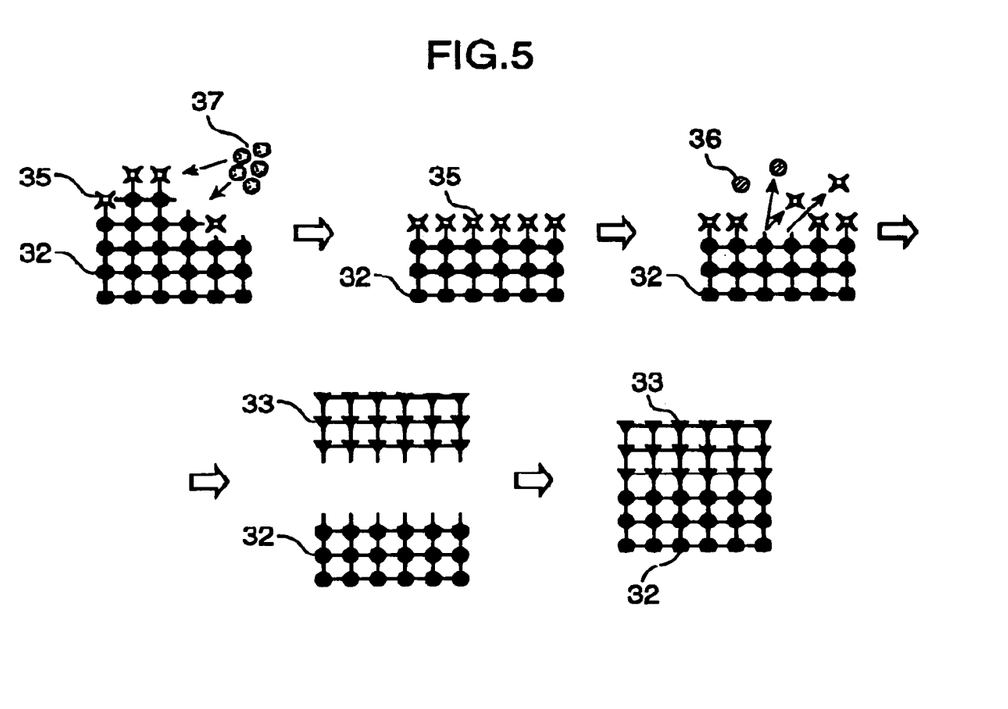
FIG. 5 is a diagram showing a state of bonding surfaces of the optical isolator element as a part of the inventive optical isolator.

FIG. 5 is a diagram showing the bonding surface of the optical isolator element 5 according to the present invention. Specifically, when the bonding surfaces of the polarizer bases and the Faraday rotator base are smoothed by being polished by abrasive grains 37, unnecessary substances 35 such as oxide films and contaminants are attached and bonded to atoms 32 in the smoothed outer surface of the polarizer bases and atoms 33 in the smoothed outer surface of the Faraday rotator base. The outer surfaces are cleaned by etching with ions or neutral atoms 36 and activated so that bonds of the atoms 32, 33 come out. When the activated outer surfaces in which the bonds are present are brought into contact with each other, the atoms bond together to join the polarizer base and the Faraday rotator base. At this time, the bases can be bonded by the intermolecular forces acting between the outer surfaces even if this outer surfaces are slightly uneven at molecular level. Pressure is applied to further attach and bond the atoms to each other better.

The polarizer bases and the Faraday rotator base thus bonded exhibit a fairly strong bonding strength and have substantially the same strength as a bulk. In accordance with the bonding principle of the present invention, the state of atoms in the outer surfaces of the respective bases is extremely essential a factor for the bonding strength of the bases.

Figure 6:
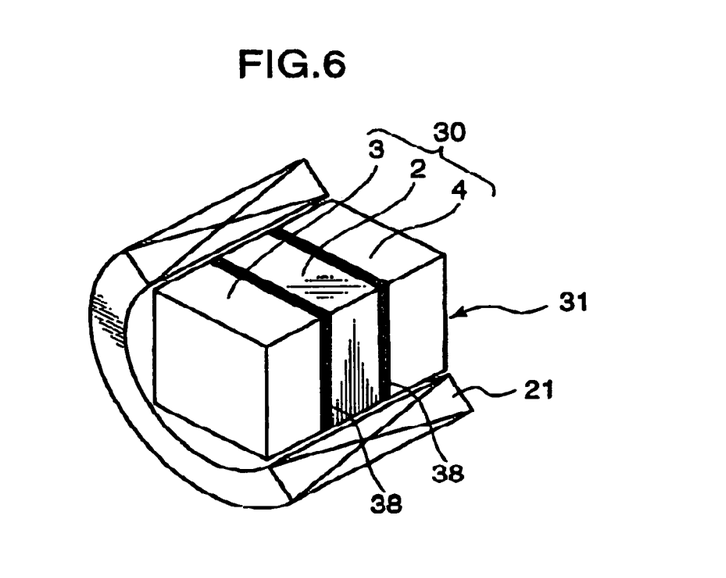
FIG. 6 is a perspective view showing an essential portion of an optical isolator according to another embodiment of the invention.

FIG. 6 is a perspective view showing an essential portion of an optical isolator according to another embodiment of the present invention. In FIG. 6, an optical isolator 31 is comprised of an optical isolator element 30 as an integral layered unit obtained by bonding flat polarizers 3, 4 on both sides of a flat Faraday rotator 2, and a tubular magnetic element 21 for accommodating this optical isolator element 30. It should be noted that, similar to the optical isolator element 5 of the former embodiment, the optical isolator element 30 is produced by bonding large polarizer bases on both sides of a large Faraday rotator base and then cutting a bonded unit into pieces of suitable size.

Here, the Faraday rotator 2 and the polarizers 3, 4 have soft materials 38 formed on their bonding surfaces. This soft material 38 is made of a metal or a semimetal thin film and formed by deposition, plating or like means. The thickness of the soft material 38 needs to be set at such a value as neither to increase a loss nor to optically influence the polarization characteristic and the like. If the wavelength of the light is λ, the thickness of the soft material 38 is preferably λ/4 or shorter.

By depositing the soft material 38 on the bonding surface, the outer surface softer than a dielectric hard material such as $SiO_2$ and $TiO_2$. Thus, the Faraday rotator base and the polarizer bases can be more easily bonded since the soft materials 38 are deformed upon applying pressures to the Faraday rotator base and the polarizer base. For example, Au, Al, Ag Cu, Sn, Zn, Ga and the like can be used as the soft material 38 in the case or a metal, whereas alloys mainly containing S1 or these metals can be used in the case of a semimetal.

In this way, the optical isolator element 30 can be produced by the same method as the one shown in FIGS. 2, 3 and 4 even if the soft materials 38 are provided on the bonding surfaces of the Faraday rotator 2 and the polarizers 3, 4. However, bonding conditions such as a degree of flatness, a degree of vacuum and a force of pressure become less strict as compared to the first embodiment having $SiO_2$ or $TiO_2$ in the bonding surfaces, thereby presenting an advantage of easiness to bond at normal temperature. The soft material 38 may be provided either on the bonding surfaces of the Faraday rotator 2 or on other those of the polarizers 3, 4.

In order to obtain a stable bonding, the atoms in the bonding surfaces are desirably atoms of the same metal or semimetal. For example, a thin film of aluminum (Al) or silicon (Si) may be so formed on the bonding surfaces of the polarizer bases and the Faraday rotator base by deposition or the like as to have a thickness of several tens nm.

As described above, in the above production process, the bonding surfaces of the polarizer bases 7 and the Faraday rotator base 7' are smoothed and cleaned upon producing the large optical element 14, thereby activating the outer surfaces of the polarizer bases 7 and the Faraday rotator base 7'. Thereafter, these activated surfaces are attached and directly bonded by the van der Waals forces. On the other hand, there is also a method according to which the outer surfaces of the polarizer bases 7 and the Faraday rotator base 7' are activated by absorbing (or imparting) hydroxyl groups to the outer surfaces of the polarizer bases 7 and the Faraday rotator base 7, and the activated polarizer bases 7 and Faraday rotator base 7' are attached to each other to be directly bonded by hydrogen-bonding forces.

In order to absorb hydroxyl groups to the outer surfaces of the polarizer bases 7 and the Faraday rotator base 7' in this bonding method, hydrogen atoms are sprayed to the polarizer bases 7 and the Faraday rotator base 7' smoothed and cleaned in a vacuum atmosphere by a process similar to the open shown in FIGS. 2 and 3 and hydroxyl groups created at the time of spraying are absorbed and then such an energy as to remove the hydrogen atoms are given to the outer surfaces of the polarizer bases 7 and the Faraday rotator base 7' in the form of a plasma beam, microwaves or the like to remove the hydrogen atoms in the outer surfaces, thereby leaving only the hydrogen groups there.

Alternatively, a high frequency wave or a dc voltage may be applied to water molecules to crack them into hydroxyl groups by an magnetic field generated thereby or by an plasma energy generated by this magnetic field, and these hydroxyl groups are sprayed to the smoothed and cleaned outer surfaces of the polarizer bases 7 and the Faraday rotator base 7' to be adsorbed.

Further, after water molecule are sprayed to the smoothed and cleaned polarizer bases 7 and the Faraday rotator base 7' and adsorbed, an energy may be imparted to the outer surfaces of the polarizer 7 and the Faraday rotator base 7' in the form of a plasma beam or microwaves, thereby cracking the water molecules in the outer surfaces into hydroxyl groups, and the cracked hydroxyl groups may be adsorbed.

In this way, there can be obtained the large optical element 14 in which the polarizer bases 7 and the Faraday rotator base 7' are directly bonded by hydrogen-bonding forces by bringing the polarizer bases 7 and the Faraday rotator base 7' having the hydroxyl groups adsorbed to their outer surfaces into contact with each other in the vacuum atmosphere.

When bringing the polarizer bases 7 and the Faraday rotator base 7' into contact, a pressing force may be exerted in bonding directions of the polarizer bases 7 and the Faraday rotator base 7' similar to the former embodiment. Further, similar to the former embodiment, the polarizer bases 7 and the Faraday rotator base 7' may have a multilayer film made of an inorganic material formed on the bonding surfaces (outer surfaces) or a soft material provided on the bonding surfaces. These multilayer film and the soft material made of the inorganic material may be provided on the bonding surfaces of either of the polarizer bases 7 and the Faraday rotator base 7' similar to the former embodiment.

Although the hydroxyl groups are adsorbed to the bonding surfaces of the polarizer bases 7 and those of the Faraday rotator base 7' in the above description, they may be adsorbed to the bonding surfaces of either one of the polarizer bases 7 and the Faraday rotator base 7'. However, even in the case of adsorbing the hydroxyl groups to the bonding surfaces of only one of the polarizer bases 7 and the Faraday rotator base 7', it is desirable to clean the bonding surfaces of the bases where no hydroxyl group is adsorbed similar to the bonding surfaces of the base where the hydroxyl groups are adsorbed.

The large optical element 14 thus obtained is cut to a suitable size using a dicing method, a wire cutting method or a like method used in the operation step shown in FIG. 4, thereby obtaining a plurality (multitude) of optical isolator elements 5 bonded by the hydrogen-bonding forces.

As described above, in the present invention, the polarizer bases 7 and the Faraday rotator base 7' are directly joined by the van der Waals forces or hydrogen-bonding forces, and no organic substance such as an adhesive is used. Thus, the optical isolator element 5 having an excellent humidity resistance can be obtained.

Further, a high-output beam from a laser light source passes through the optical isolator element 5. If the polarizer bases 7 and the Faraday rotator base 7' are joined by an adhesive as in the prior art, the adhered portions are deteriorated by such a high-output beam to reduce a transmittance, whereby may be deteriorated. However, in the present invention, the optical isolator element 5 having an excellent light resistance can be obtained since no organic substance such as an adhesive is used.

As a method for fixing the optical isolator element 5 upon incorporating it into a laser module, fixing by melting a solder, fixing by a YAG laser or bonding using a thermosetting adhesive may be thought. In each case, the optical isolator element 5 is exposed to a high temperature. However, according to the present invention, since no organic substance such as an adhesive is used, the deterioration of a resin such as an adhesive does not occur even at a high temperature, with the result that the optical isolator element 5 having an excellent heat resistance can be obtained.

In this connection, if a large Faraday rotator base and two polarizer bases are placed one over another, for example, using a low melting point glass in order to obtain the optical isolator element 5, the Faraday rotator base and the polarizer bases are cracked or peeled off at the adhered portions due to the influence of a created thermal stress. A thermal stress P created in the case of bonding two members using a bonding member such as a low melting point glass is expressed as in the followed equation (1):

$$P = K \times \Delta\alpha \times L \times (t2-t1) + E \quad (1)$$

where K: coefficient based on the elastic moduli and the like of the respective members, $\Delta\alpha$: thermal expansion coefficient difference between the respective members, L: size of the members, t2: heating temperature at the time of adhesion (glass transition temperature in the case of bonding using a low melting point glass), t1: room temperature and E: other factor.

In this way, the thermal stress to act on the member to be adhered is proportional to the thermal expansion coefficient difference between the members, the heating temperature at the time of adhesion, and the size of the members. If these factors are large, the thermal stress to act on the members increases.

Generally, the glass transition temperature of the low melting point glass is 300° C. or higher, and the thermal stress to be created increases since the term (t2-t1) of equation (1) is larger. In order to compensate for this, the size of the members, i.e. the size of the bases needs to be set at a specified value or smaller. Thus, the number of the optical isolator elements 5 obtained at once inevitably decreases, resulting in poor mass productivity.

Contrary to this, if the inventive method is used, the term (t2-t1) of equation (1) is smaller and the creation of a thermal stress can be sufficiently suppressed since the Faraday rotator base and the polarizer bases are bonded at room temperature. Thus, the large Faraday rotator base and the large polarizer bases can be bonded and a large number of optical isolator elements can be obtained at once. This leads to an excellent mass productivity, enabling the optical isolator elements to be lowly priced.

Figure 7:
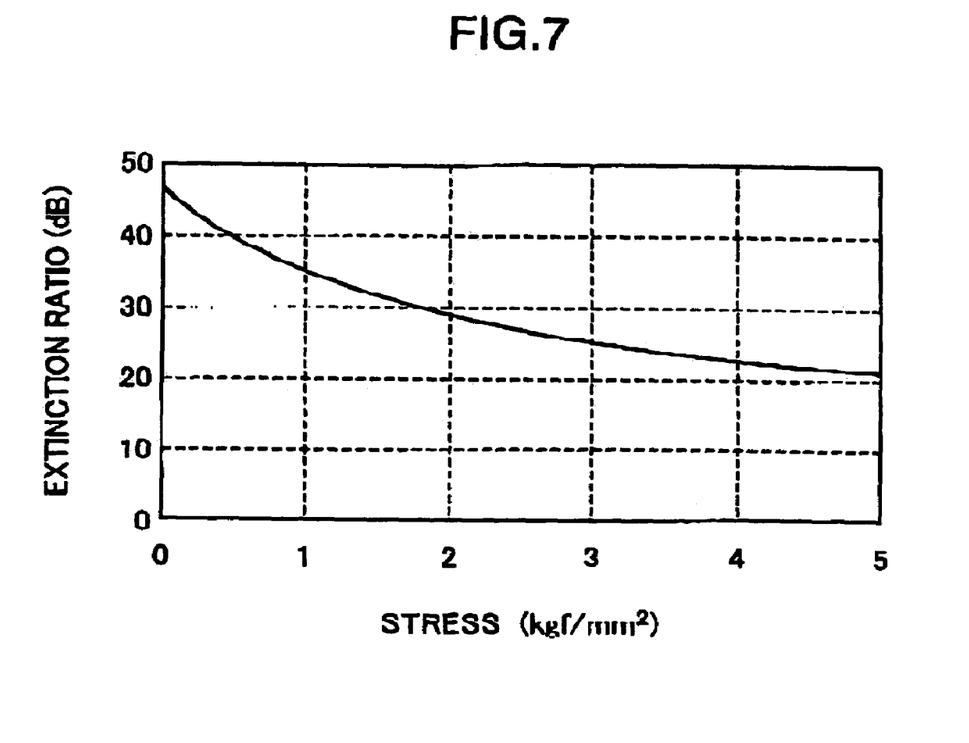
FIG. 7 is a characteristic graph showing an extinction ratio in relation to a stress acting on a Faraday rotator.

If a thermal stress acts on the elements of the optical isolator 1 shown in FIG. 1, particularly on the Faraday rotator 2, the extinction ratio of the linearly polarized light passing the Faraday rotator 2 is decreased as is clear from FIG. 7 showing a relationship of the stress acting on the Faraday rotator and the extinction ratio, with the result that the reverse-direction loss characteristic of the optical isolator 1 is deteriorated. This is described with reference to FIG. 1. A reflected return light incident in a reverse direction transmits the polarizer 4 to become a linearly polarized light. The linearly polarized light having transmitted the Faraday rotator 2 is rotated by −45° and, simultaneously, produce polarized light components orthogonal thereto. If the extinction ratio is decreased, these orthogonal polarized light component increase, which leads to a deteriorated reverse-direction loss characteristic since they transmit the polarizer 3.

In FIG. 7, horizontal axis represents stress and vertical axis represents the extinction ratio of the light transmitting the Faraday rotator 2. As can be seen from FIG. 5, the extinction ratio of the transmitting light is good by taking a value of 47 dB in a state where no stress acts. However, as the stress increases, the extinction ratio of the transmitting light decreases. As a stress of 3 Kgf/mm², the extinction ratio is below 25 dB which is a general characteristic lower limit value of the optical isolator 1.

The thermal stress to act on the Faraday rotator increases if the low melting point glass is used as a bonding member of the optical isolator 1. However, according to the inventive method, the creation of the thermal stress can be sufficiently suppressed since the Faraday rotator base and the polarizer bases forming the optical isolator element are bonded at room temperature. As a result, the optical isolator element 5 having excellent optical characteristics can be obtained. It should be noted that room temperature is a temperature range of −20° C. to 70° C. in the present invention.

EXAMPLES

As an example of the inventive optical isolator, a sample of the optical isolator element shown in FIG. 1 was made.

There were prepared two large polarizer bases having a size of 10 mm×10 mm×0.2 mm (length×width×thickness) and a refractive index of 1.47 and one large Faraday rotator base having a size of 10 mm ×10 mm ×0.4 mm (length× width×thickness) and a refractive index of 2.35. Here, the transmitting and polarizing directions corresponding to the outer shape of the two polarizer bases and the polarization rotation angle and the other polarization characteristics of the Faraday rotator base were measured beforehand, and a relative angle of the polarizer bases to provide a good isolation characteristic was calculated beforehand.

Specifically, Polar Cores (product name) produced by Coning Ltd. were used as the polarizer bases and a bismuth-substituted garnet was used as the Faraday rotator base. After a suitable number of $TiO_2$ and $SiO_2$ layers were formed on the outer surfaces of the Faraday rotator base and an anti-reflection film was formed for a medium having a refractive index of 1.45, a film of $SiO_2$ having a thickness of 100 nm was formed on the outer surface. It should be noted that the refractive index of $SiO_2$ is 1.45.

Subsequently, the outer surface of the polarizer bases and the $SiO_2$ films on the outermost surfaces of the Faraday rotator base were chemically polished using the CMP technique. As a polishing solution, a mixed solution of a sulfuric acid and a hydrogen peroxide having a chemically corrosive action was used. By this chemical polishing, the surface coarsenesses of the respective bases came to take values of about 10 nmRa.

Subsequently, the respective outer surfaces of the polarizer base and the Faraday rotator base were activated and bonded in a vacuum bath. The polarizer base and the Faraday rotator base were held by specific jigs in the vacuum bath and air was discharged from the vacuum bath by means of a vacuum pump until a degree of vacuum reached $10^{-7}$ Torr. Thereafter, the respective bonding surfaces (outer surfaces) of the polarizer base and the Faraday rotator base were irradiated by an argon beam for 60 sec. to be cleaned and activated. An energy of the argon beam was about 1 keV, and an angle of irradiation to the bonding surfaces was 45° C.

Etching by the irradiation of the argon beam is about 5 nm and sufficiently small, thus giving no influence on the optical characteristics. Thereafter, the polarizer base and the Faraday rotator base had the relative angles thereof adjusted based on the outer shape thereof in the vacuum bath and then were bonded by being directly brought into contact and pressurized. A pressure of 1 kgf was given for 3 min. By this bonding, the polarizer bases having a refractive index of 1.47 and the Faraday rotator base having the $SiO_2$ films having a refractive index of 1.45 formed on the outer surfaces thereof are brought into contact. Since a difference between the refractive index of the polarizer bases and that of the Faraday rotator base is sufficiently small, reflectance at the boundary surfaces is sufficiently small by taking a value of 0.01%.

An optical element comprised of the bonded polarizer bases and the Faraday rotator base was cut by dicing to obtain 49 optical isolator elements having a size of 1.2 mm×1.3 mm (length×width).

No cracking, chipping or peeling was found in these 49 optical isolator elements. As a result of applying a saturated magnetic field to the produced optical isolator elements and measuring the characteristics thereof, all the optical isolator elements were confirmed to have good and uniform characteristics by having an insertion loss of 0.2 dB or smaller and an isolation of 40 dB or higher. As a comparative example, prior art products having the same conditions such as the size as the inventive products were produced at the same time by bonding the polarizer bases and the Faraday rotator base using a low melting point glass. Isolation characteristics average values and crack occurring rates of the inventive optical isolator elements and the prior art optical isolator elements thus produced are shown in the following table.

| | OPTICAL ELEMENT BONDING METHOD | |
|---|---|---|
| | Direct Bonding | Low Melting Point Glass |
| R-D Loss characteristic (average of 11) Unit: dB | 42.3 | 33.0 |
| Crack Occurring Rate Unit: % | 0.0 | 73 |

As shown in the above table, the isolation characteristic was considerably deteriorated to cause cracks in the polarizers since a larger thermal stress was created in the prior art optical isolator elements using the low melting point glass. Contrary to this, a good isolation characteristic was obtained for the optical isolator elements produced according to the inventive method and no crack was found therein.

Upon conducting a shearing test for the chip-shaped optical isolator elements obtained by cutting the large optical element, all the optical isolator elements were fractured only inside the optical isolator elements, but not in the bonding surfaces, thereby confirming a sufficient bonding strength.

As is clear from the results of the tests conducted for the samples, the inventive optical isolator elements could be produced by the substantially same process as the one for the prior art optical isolator elements using the adhesive, could be miniaturized and could ensure the long-term stability of the bonding surfaces.

Although the inventive optical isolators 1, 31 both employ the optical isolator element 5, 30 comprised of one Faraday rotator 2 and two polarizers 3, 4 bonded at both sides of the Faraday rotator 2 in the foregoing embodiments, the present invention is not limited thereto.

Figure 8:
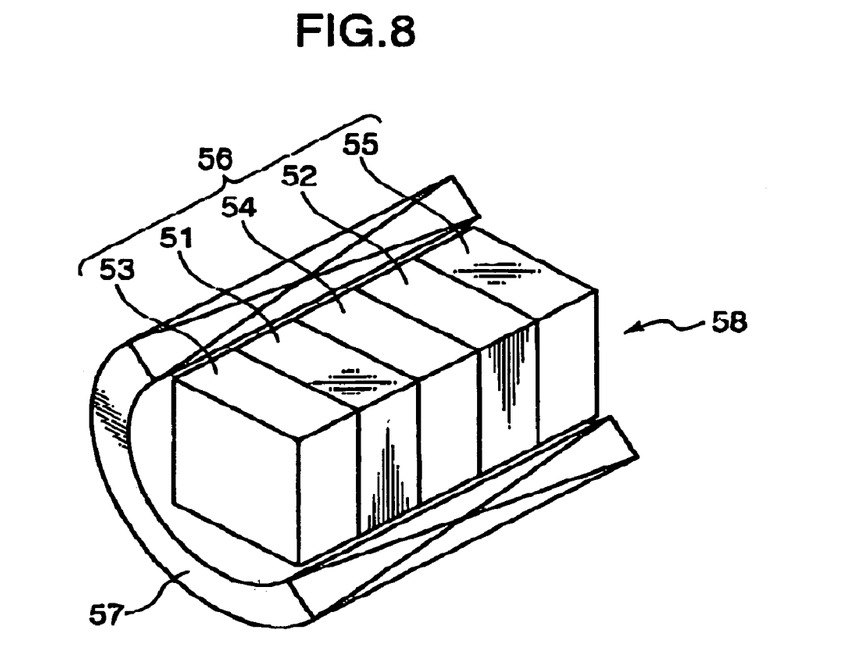
FIG. 8 is a perspective view showing another construction example of the optical isolator element as a part of the inventive optical isolator.

For example, as shown in FIG. 8, an optical isolator 58 may be constructed by using an optical isolator element 56 in which two Faraday rotators 51, 52 and three polarizers 53, 54 55 are alternatively bonded such that the two polarizers 52, 55 are located at the outer sides and accommodating this optical isolator element 56 in a tubular magnetic element 57. The optical isolator element 56 having the construction shown in FIG. 8 can be produced by a process similar to the one described in the foregoing embodiments.

Figure 9:
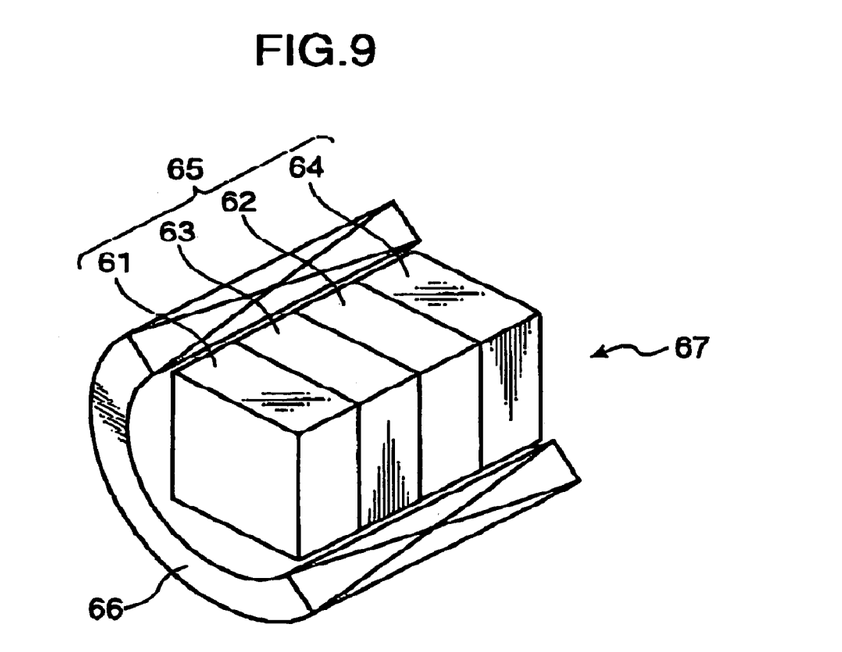
FIG. 9 is a perspective view showing still another construction example of the optical isolator element as a part of the inventive optical isolator.

Further, as shown in FIG. 9, an optional isolator 67 may be constructed by using an optical isolator element 65 in which two Faraday rotators 61, 62 and two polarizers 63, 64 are alternatively bonded and accommodating this optical isolator element 65 in a tubular magnetic element 66. The optical isolator element 65 having the construction shown in FIG. 9 can also be produced by a process similar to the one described in the foregoing embodiments.

Although the optical isolator elements 5, 30 are entirely accommodated in the tubular magnetic elements 6, 21 in both inventive optical isolators 1, 31 of the foregoing embodiments, the present invention is not limited thereto. For example, only the Faraday rotator 2 forming the optical isolator element 5, 30 bay be covered by the magnetic element 6, 21.

Although both inventive optical isolators 1, 31 employ the tubular magnetic elements 6, 21 in the foregoing embodiments, the present invention is not limited thereto. For example, a plurality of independent magnetic elements may be arranged around the optical isolator element 5, 30 or only around the Faraday rotator 2 forming the optical isolator element 5, 30.

As described above, the present invention concerns the optical isolator element in which at least one flat Faraday rotator and at least two flat polarizers are bonded to each other into an integral unit by the van der Waals forces acting between the bonding surfaces of the Faraday rotator and the polarizers.

Since the flat Faraday rotator and the flat polarizers are bonded into the integral unit by the van der Waals forces acting between the bonding surfaces thereof in such an optical isolator element, the creation of cracks resulting from the thermal stress can be suppressed and the optical isolator element having excellent light resistance, heat resistance, humidity resistance and isolation characteristic can be obtained.

In the inventive optical isolator element bonded by the van der Waals forces, the bonding surfaces of at least either the Faraday rotator or the polarizers may be integrally provided with the films made of an inorganic material.

With such a film, the reflection of an incident beam at the bonding surface can be suppressed by forming the film on the outer surface of a material having a reflective index approximate to that of the adjacent element.

In the inventive optical isolator element bonded by the van der Waals forces, the bonding surfaces of at least either the Faraday rotator or the polarizers may be integrally provided with two films made of a soft material.

With such a film, the bonding surface is made softer by the soft material and becomes easier to deform. Thus, the Faraday rotator and the polarizers can be more easily bonded, thereby securing the bonding between the Faraday rotator and the polarizer.

The present invention also concerns the optical isolator element in which at least one flat Faraday rotator and at least two flat polarizers are bonded to each other into an integral unit by the hydrogen-bonding forces acting between the bonding surfaces of the Faraday rotator and the polarizers.

Since the flat Faraday rotator and the flat polarizers are bonded into the integral unit by the hydrogen-bonding forces acting between the bonding surfaces thereof in such an optical isolator element, the creation of cracks resulting from the thermal stress can be suppressed and the optical isolator element having excellent light resistance, heat resistance, humidity resistance and isolation characteristic can be obtained.

In the inventive optical isolator element bonded by the hydrogen-bonding forces, the bonding surfaces of at least either the Faraday rotator or the polarizers may be integrally provided with the films made of an inorganic material.

With such a film, the reflection of an incident beam at the bonding surface can be suppressed by forming the film on the outer surface of a material having a refractive index approximate to that of that adjacent element.

In the inventive optical isolator element bonded by the hydrogen-bonding forces, the bonding surfaces of at least either the Faraday rotator or the polarizers may be integrally provided with the films made of a soft material.

With such a film, the bonding surface is made softer by the soft material and becomes easier to deform. Thus, the Faraday rotator and the polarizers can be more easily bonded, thereby securing the bonding between the Faraday rotator and the polarizer.

The inventive optical isolator comprises the optical isolator element in which at least one flat Faraday rotator and at least two flat polarizers are bonded into an integral unit by the van der Waals forces acting between the bonding surfaces thereof, and the magnetic element arranged around the optical isolator element.

In such an optical isolator, since the optical isolator element is constructed by bonding the flat Faraday rotator and the flat polarizers into the integral unit by the van der Waals forces acting between the bonding surfaces thereof, the optical isolator having excellent light resistance, heat resistance, humidity resistance and isolation characteristic can be obtained.

In the inventive optical isolator, the magnetic element in tubular and the optical isolator element bonded by the van der Waals forces is arranged inside the tubular magnetic element.

With this arrangement, a highly reliable optical isolator can be realized since the magnetic element can be securely arranged around the Faraday rotator forming the optical isolator element.

The inventive optical isolator comprises the optical isolator element in which at least one flat Faraday rotator and at least two flat polarizers are bonded into an integral unit by the hydrogen-bonding forces acting between the bonding surfaces thereof, and the magnetic element arrangement around the optical isolator element.

In such an optical isolator, since the optical isolator element is constructed by bonding the flat Faraday rotator and the flat polarizers into the integral unit by the hydrogen-bonding forces acting between the bonding surfaces thereof, the optical isolator having excellent light resistance, heat resistance, humidity resistance and isolation characteristic can be obtained.

In the inventive optical isolator, the magnetic element is tubular and the optical isolator element bonded by the hydrogen-bonding forces is arranged inside the tubular magnetic element.

With this arrangement, a highly reliable optical isolator can be realized since the magnetic element can be securely arranged around the Faraday rotator forming the optical isolator element.

The present invention also concerns the method for producing the optical isolator element including at least one flat Faraday rotator and at least two flat polarizers bonded to each other, comprising the steps of activating the bonding surface of the Faraday rotator and the polarizers: and bringing the Faraday rotator and the polarizers having the bonding surfaces activated into contact with each other in vacuum, thereby bonding the Faraday rotator and the polarizers by van der Waals forces created on the bonding surfaces of the Faraday rotator and the polarizers.

With this method, since the flat Faraday rotator and the flat polarizers are bonded into an integral unit by the van der Waals forces acting between the bonding surfaces thereof, no organic adhesive or no low melting point glass is present unlike the prior art. Therefore, the creation of cracks resulting from a thermal stress can be suppressed and an optical isolator element having excellent light resistance, heat resistance, humidity resistance and isolation characteristic can be obtained.

In the inventive method, the step of smoothing the bonding surfaces of the faraday rotator and the polarizers may be performed before the step of activating the bonding surfaces of the Faraday rotator and the polarizers.

With such a method, large van der Waals forces are created on the bonding surfaces of the Faraday rotator an the polarizers by smoothing the bonding surfaces of the Faraday rotator and the polarizers, with the result that the Faraday rotator and the polarizers can be securely bonded.

In the inventive method, the bonding surfaces may be so smoothed that the surface coarsenesses thereof are 10 nm or below.

With such a method, large van der Waals forces are created on the bonding surfaces of the Faraday rotator and the polarizers to securely bond the Faraday rotator and the polarizers.

In the inventive method, a pushing force may be exerted in such a direction as to bond the Faraday rotator and the polarization when the Faraday rotator and the polarizer having the bonding surfaces thereof activated are brought into contact with each other in vacuum.

With such a method, large van der Waals forces are created on the bonding surface of the Faraday rotator and the polarizers to securely bond the Faraday rotator and the polarizers, whereby a highly reliable optical isolator element can be obtained.

In the inventive method, the step of integrally forming the film made of an inorganic material on the bonding surfaces of at least either one of the Faraday rotator and the polarizers may be performed before the step of activating the bonding surfaces of the Faraday rotator and the polarizers.

With such a method, the reflection of an incident beam at the bonding surface can be suppressed by forming the film on the outer surface of the material having a refractive index approximate to that of the adjacent element, whereby an optical isolator element optical characteristics can be obtained.

In the inventive method, the step of integrally forming the film made of a soft material in the bonding surfaces of at least either one of the Faraday rotator and the polarizers may be performed before the step of activating the bonding surfaces of the Faraday rotator and the polarizers.

With such a method, the bonding surfaces is made softer by the soft material and becomes easier to deform. Thus, the Faraday rotator and the polarizers can be more easily bonded, thereby securing the bonding between the Faraday rotator and the polarizer. Thus, a highly reliable optical isolator can be realized.

The present invention further concerns the method for producing the optical isolator element including at least one flat Faraday rotator and at least two flat polarizers bonded to each other, comprising the steps of cleaning the bonding surfaces of the Faraday rotator and the polarizers; activating the bonding surfaces of at least either one of the Faraday rotator and the polarizers by the adsorption of hydroxyl groups; and bringing the Faraday rotator and the polarizer into contact with each other in vacuum, thereby bonding the Faraday rotator and the polarizers by the hydrogen-bonding forces acting between the hydroxyl groups on the bonding surfaces at one side and oxygen atoms in the other bonding surfaces.

With this method, since the flat Faraday rotator and the flat polarizers are bonded into an integral unit by the hydrogen-bonding forces acting between the building surfaces thereof, the creation of cracks resulting from a thermal stress can be suppressed and an optical isolator element having excellent light resistance, heat resistance, humidity resistance and isolation characteristic can be obtained.

In the second inventive method, the step of smoothing the bonding surfaces of the Faraday rotator and the polarizers may be performed before the step of cleaning the bonding surfaces of the Faraday rotator and the polarizers.

With such a method, large hydrogen-bonding forces are created on the bonding surfaces of the Faraday rotator and the polarizers by smoothing the bonding surfaces of the Faraday rotator and the polarizers, whereby the Faraday rotator and the polarizers can be securely bonded to each other.

In the second inventive method, the bonding surfaces are so smoothed that the surface coarsenesses thereof are 10 nm or below.

With such a method, large hydrogen-bonding forces are created on the bonding surfaces of the Faraday rotator and the polarizers to securely bond the Faraday rotator and the polarizers.

In the second inventive method, the step of integrally forming the films made of an inorganic material on the bonding surfaces of at least either one of the Faraday rotator and the polarizers may be performed before the step of cleaning the bonding surfaces of the Faraday rotator and the polarizers.

With such a method, the reflection of an incident beam at the bonding surface can be suppressed by forming the film on the outer surface of the material having a refractive index approximate to that of the adjacent element, whereby an optical isolator element having excellent optical characteristics can be obtained.

In the second inventive method, the step of integrally forming the films made of a soft material on the bonding surfaces of at least either one of the Faraday rotator and the polarizers may be performed before the step of cleaning the bonding surfaces of the Faraday rotator and the polarizers.

With such a method, the bonding surface is made softer by the soft material and becomes easier to deform. Thus, the Faraday rotator and the polarizers can be more easily bonded, thereby securing the bonding between the Faraday rotator and the polarizers. Thus, a highly reliable optical isolator can be realized.

This application is based on patent application No. 2003-21092 filed in Japan, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embrace by the claims.

What is claimed is:

1. An optical isolator element comprising:
   at least one flat Faraday rotator, and
   at least two flat polarizers,
   wherein the Faraday rotator and the polarizers are bonded to each other by van der Waals forces acting between bonding surfaces thereof,
   with the bonding surfaces being brought into contact with each other while the bonding surfaces are activated such that atom bonds are present thereon,
   wherein the bonding surfaces of at least either one of the Faraday rotator and the polarizers are integrally provided with films made of a soft material which is softer than a dielectric hard material, wherein the soft material is selected from the group consisting of Au, Al, Ag, Cu, Sn, and Ga.

2. An optical isolator element according to claim 1, wherein the bonding surface of at least either one of the Faraday rotator and the polarizers is integrally provided with an anti-reflection multi-layer film made of an inorganic material.

3. An optical isolator comprising:
   an optical isolator element according to claim 1,
   and a magnetic element arranged around the optical isolator element.

4. An optical isolator element according to claim 3, wherein the magnetic element is tubular and the optical isolator element is arranged inside the tubular magnetic element.

* * * * *